A. S. HUBBARD.
ELECTRICAL SYSTEM OF DISTRIBUTION.
APPLICATION FILED MAR. 1, 1909.
1,160,609.
Patented Nov. 16, 1915.
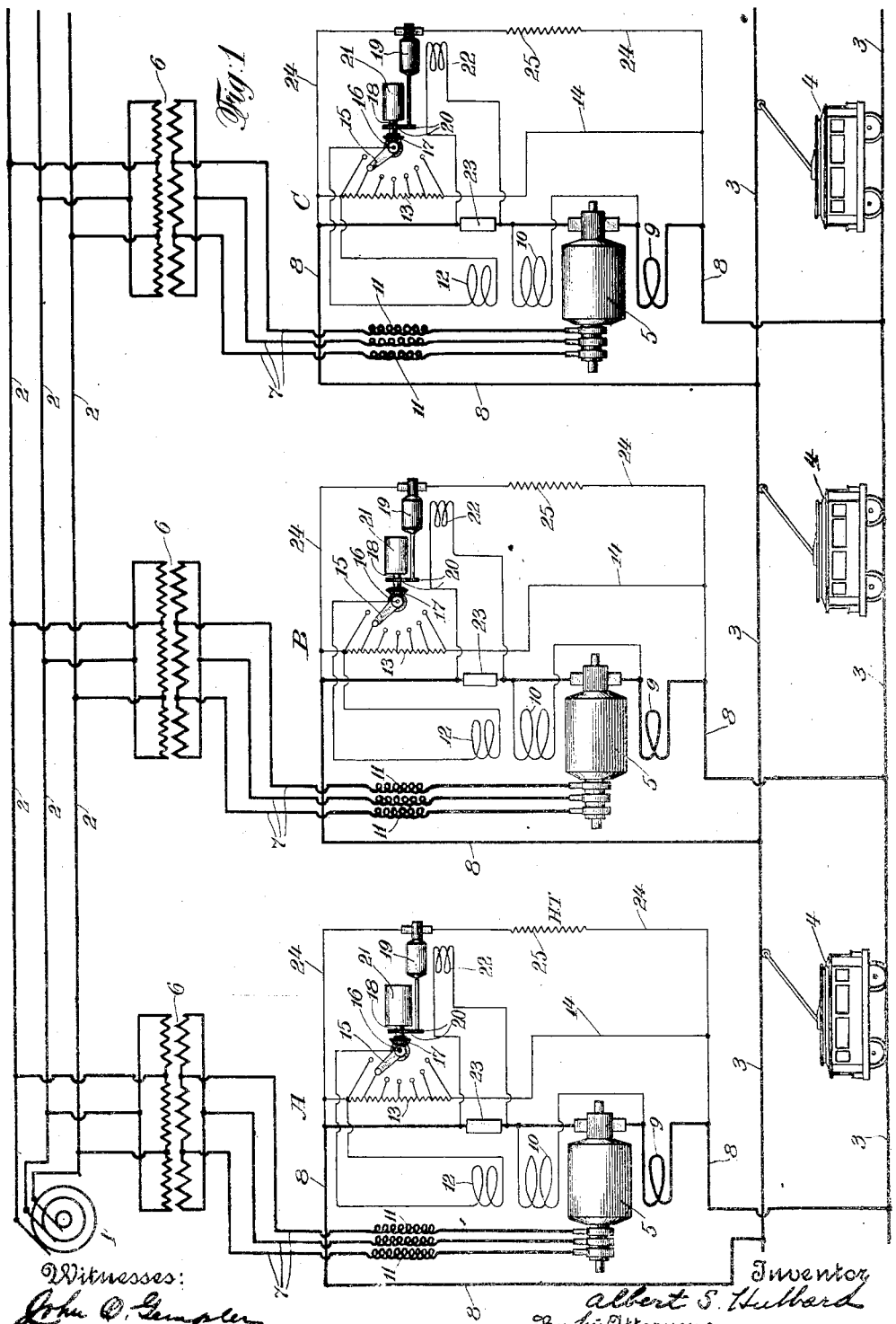

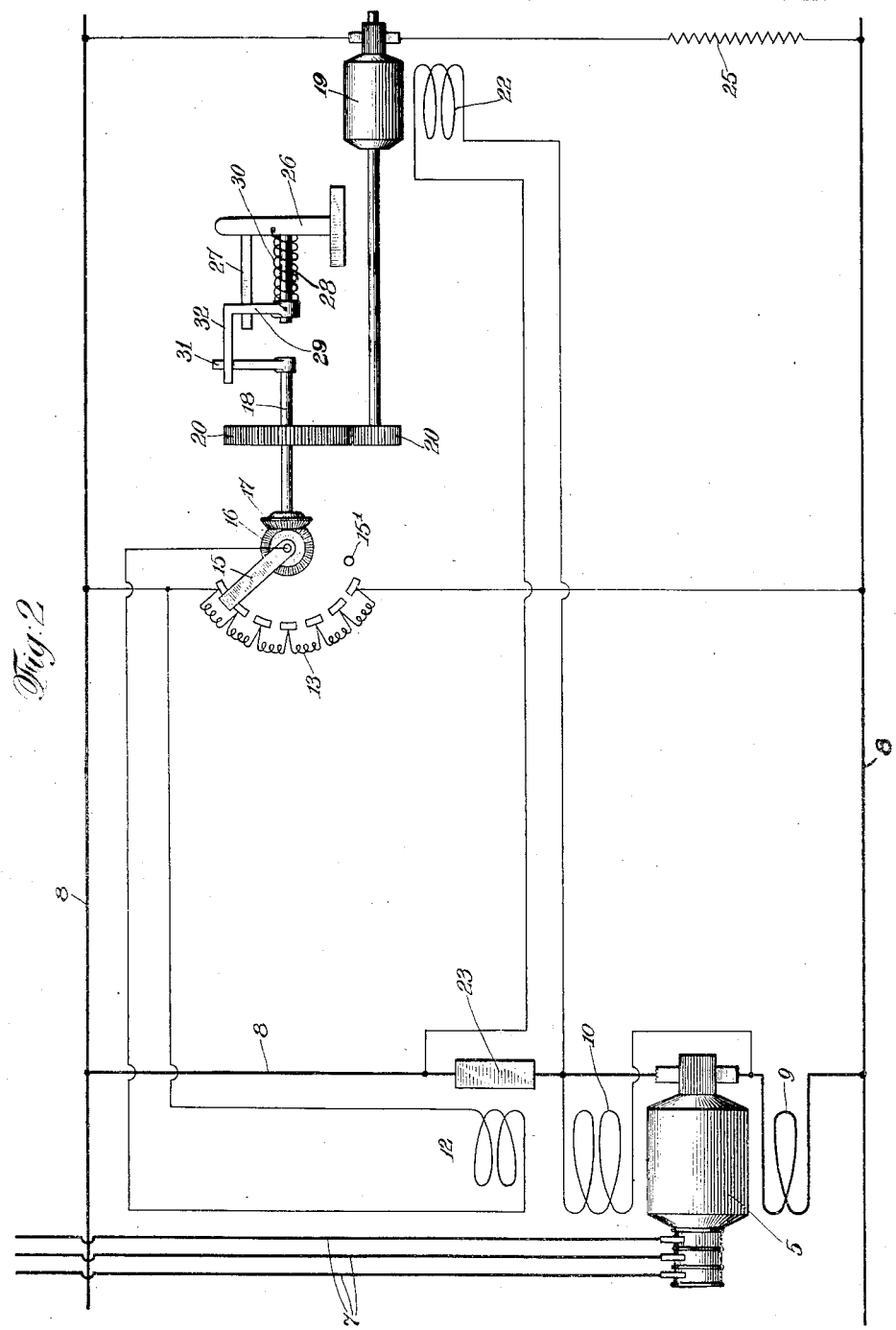

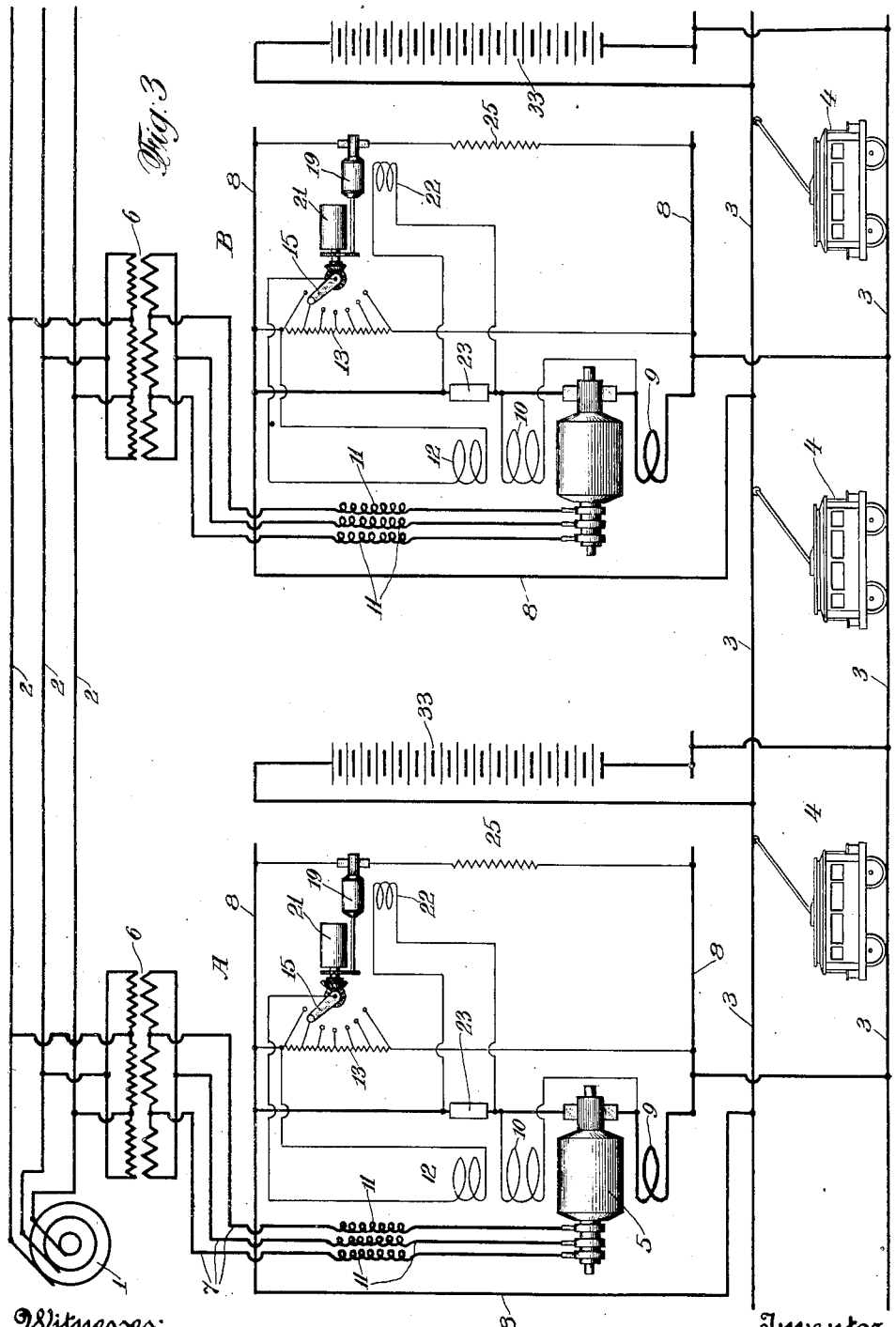

A. S. HUBBARD.
ELECTRICAL SYSTEM OF DISTRIBUTION.
APPLICATION FILED MAR. 1, 1909.
1,160,609.
Patented Nov. 16, 1915.
5 SHEETS—SHEET 4.
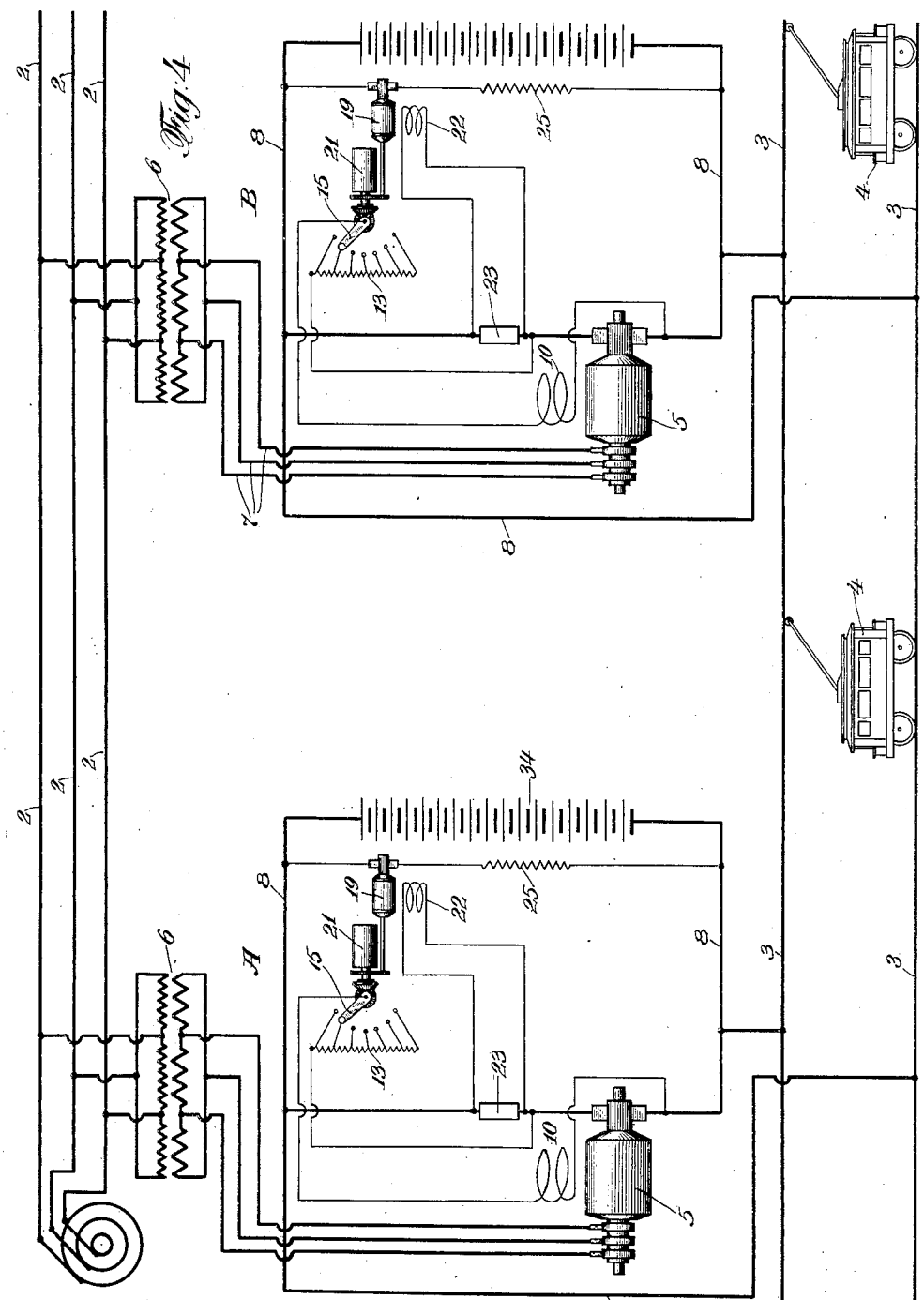

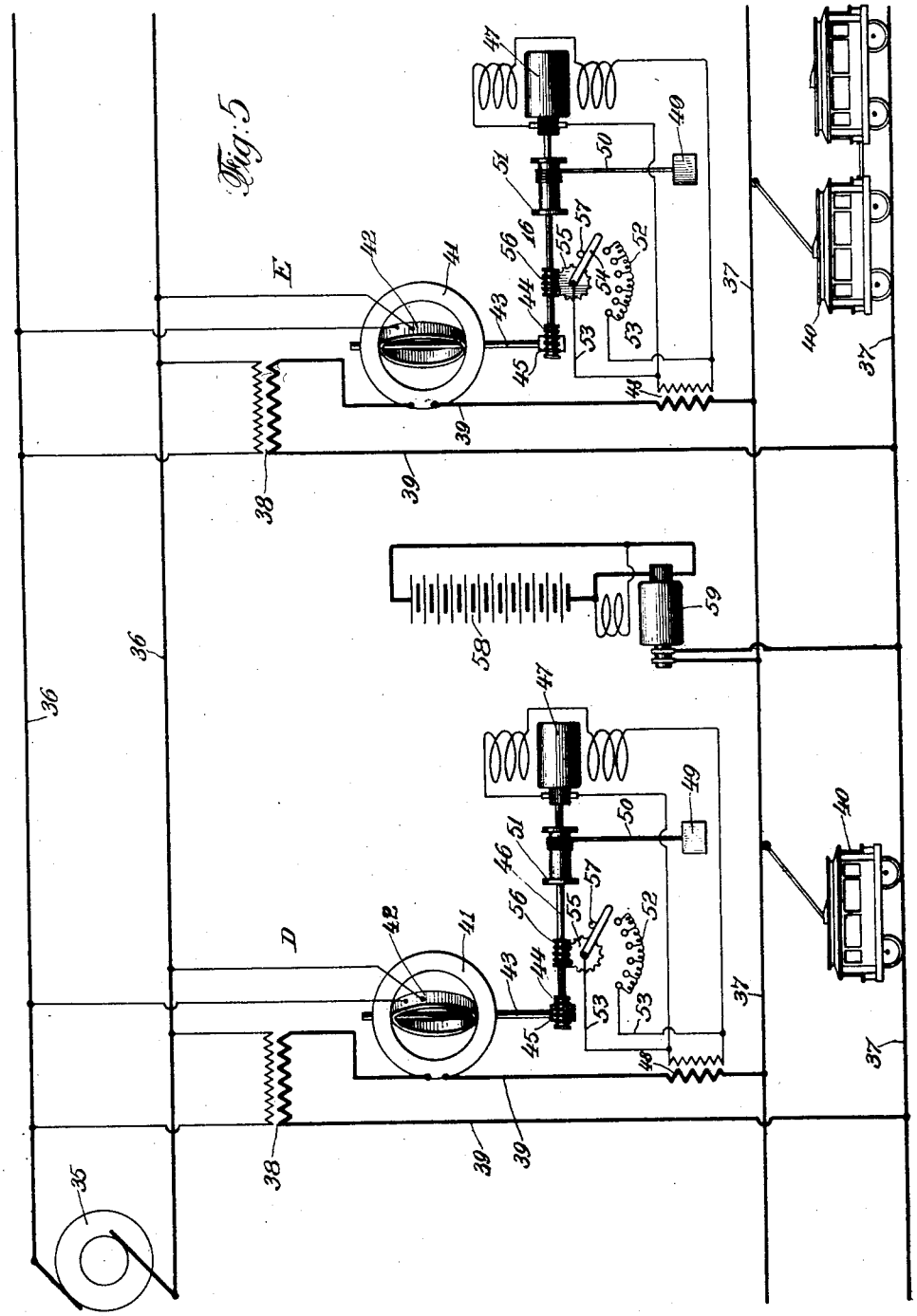

UNITED STATES PATENT OFFICE.

ALBERT S. HUBBARD, OF BELLEVILLE, NEW JERSEY, ASSIGNOR TO GOULD STORAGE BATTERY COMPANY, A CORPORATION OF NEW YORK.

ELECTRICAL SYSTEM OF DISTRIBUTION.

1,160,609.      Specification of Letters Patent.      Patented Nov. 16, 1915.

Application filed March 1, 1909. Serial No. 430,720.

*To all whom it may concern:*

Be it known that I, ALBERT S. HUBBARD, a citizen of the United States, and a resident of Belleville, county of Essex, and State of New Jersey, have invented certain new and useful Improvements in Electrical Systems of Distribution, of which the following is a specification.

My invention relates to electrical systems of distribution, and involves a system of that class in which a work circuit such, for example, as an electric railway circuit, is supplied at different points from different feeding stations such, for example, as substations which are themselves supplied from a transmission feeding circuit.

The object of my invention is to increase the efficiency and maintain a more nearly constant potential for the translating devices than has hitherto been obtained; and to this end, I provide means whereby, up to somewhere near the capacity of a station, the load upon the translation or working circuit will be almost entirely supplied from a near-by station or stations, but when the load adjacent to a station or stations increases beyond a given point, means are provided to sufficiently lower the voltage at the near-by stations to maintain them at an approximately constant output, the excess load on the near-by portions of the translation circuit being thus transferred to other more distant stations. To effect this purpose, I preferably provide each station with an electro-responsive device such as a motor, which is governed by the current output of the station and which tends, as that current increases beyond a certain predetermined value, to reduce the field magnetization of the rotary converter or other electrical source in the station, sufficiently to prevent a substantial increase of current from the station whereby any such increase demanded by the translation circuit will be taken from other stations. To obtain the full utility of my invention in its preferred form, the apparatus of each station is overcompounded; that is, it is wound to have a rising characteristic, the result being that if a train, for example, is immediately adjacent to a station, it will receive its entire energy from that station, provided it does not demand more than the predetermined current for which the regulating apparatus in the station is adjusted. This very much reduces line losses, while maintaining the voltage across the work circuit much more constant than is possible with the ordinary system of this class in which drooping characteristic stations have been provided.

My system is therefore one in which, ordinarily, each station is of the constant potential type (although preferably having a rising characteristic) with means for changing the station, after a certain output is reached, to a station of the constant current type (although, of course, the current may be allowed to vary within reasonable limits). The work circuit for which it is most peculiarly adapted is one having an unsymmetrical and changing division of load, the best extreme example of which is an electric railroad upon which large train units are operated.

My improvements also adapt such systems to be especially efficient and effectively operated in connection with storage batteries which may be either operatively connected with the work circuit at the various stations or operatively connected with the work circuit at points intermediate the various stations.

Various other objects, features and advantages will more clearly appear from the detailed description given below taken in connection with the accompanying drawings which form a part of this specification.

In the drawings, Figure 1 represents diagrammatically a system embodying one form of my invention. Fig. 2 is a detail showing parts of the system shown in Fig. 1 and regulating apparatus therefor. Fig. 3 is a modification of the system shown in Fig. 1. Fig. 4 is a modification of the system shown in Fig. 3, and Fig. 5 is still another modification of a system embodying one form of my invention in which alternating currents are used both in the transmission circuit and on the work circuit.

Referring to Fig. 1, 1 represents a source of three-phase alternating current supplying the high tension transmission circuit 2, 2, 2. 3, 3 represent a direct current work circuit, which work circuit may supply trolley cars 4, 4 or any other kind of translating devices. In order to supply electrical energy to the work circuit 3, 3 from the transmission circuit 2, 2, 2, I provide various sub-stations A, B, C distributed along said circuits at some distance from each other. Each sub-station is provided with a rotary converter 5, which is supplied with three-phase current from the transmission circuit 2, 2, 2, by means of a transformer 6 and circuits 7. The direct current end of each rotary converter 5 supplies a direct current circuit 8, 8, 8, which in turn supplies the direct current work circuit 3, 3. Each rotary converter 5 is provided with a series coil 9 in series with the direct current circuit 8 and a shunt coil 10 in shunt with the direct current end of the rotary converter. These rotary converters are thus compound wound and may be designed to have either a flat or rising characteristic. 11, 11, represent inductances in series in the alternating current circuits 7 in order to properly adjust the phase relation of the currents in said circuits with respect to the varying field excitations of the converters 5. 12 represents a teaser field coil on each converter, one end of which is connected to one end of a variable resistance 13, which resistance is connected across the direct current circuit 8, 8, by means of a circuit 14. The other end of the field coil 12 is connected to a movable arm 15 which is adapted to contact with various points of the variable resistance 13 so that as the arm 15 moves over these contact points the coil 12 will be connected to points of varying differences of potential of the resistance 13, so that the excitation of the field coil 12 is thereby varied. The movable arm 15 at each station is fixed to a pinion 16, which pinion is engaged to be rotated by a beveled pinion 17 on shaft 18, the shaft 18 being arranged to be rotated by a motor 19 through gears 20. 21 represents a case containing apparatus for preventing the rotation of the arm 18 until a predetermined torque has been applied thereto. Details of this apparatus will be given hereafter. Each motor 19 is provided with a field 22 connected in shunt to the small resistance 23 in series in the direct current circuit 8. The armature of each motor 19 is connected across the direct current circuit 8 by means of a circuit 24. A high temperature coefficient resistance 25 is inserted in series therewith in order to prevent an undue amount of current flowing through the motor.

Referring to Fig. 2 the details of the apparatus within the casing 21 are clearly shown. These details are a framework 26 carrying an arm 27 fixed thereto. 28 represents another arm fixed thereto and 29 is a member rotatably mounted upon and near the end of the arm 28. A spring 30 secured at one end to the frame 26 and at the other end to the member 29 always tends to force the member 29 against the arm 27, which acts as a stop for the same. The shaft 18 is provided with an arm 31 fixedly secured thereto which is arranged to engage an extension 32 upon the member 29. The parts are so arranged that when the motor 19 rotates the arm 18 is caused to rotate, thereby engaging the extension 32 and rotating the arm 29 against the action of the spring 30. From this it will be apparent that the motor must generate sufficient torque to overcome the initial opposition of the spring 30 before any rotation of the motor 19 will be had or before any movement of the arm 15 will be had. The movement of the switch arm 18 may be limited by a stop 15′.

Referring again to Fig. 1, the operation is as follows: As the load on any sub-station increases the increase in load is taken by that sub-station with the voltage either remaining the same or rising, until a predetermined load is reached. When this predetermined load or value of current output has been reached the current in field coil 22 has reached a value sufficient to produce a torque in motor 19 great enough to overcome the opposing action of the spring 30. The arm 15 thereupon moves over the various contacts of resistance 13, thereby energizing the field coil 12 of the converter 5 in a direction to cut down the total excitation of the converter, so that the voltage applied to the direct current circuit 8 and to the work circuit 3, at that sub-station, is materially decreased. This decrease in voltage of the work circuit 3, 3, at the sub-station causes one or more adjacent sub-stations to furnish energy thereto to help take the increase in load. Thus if the work circuit 3, 3, should be overloaded at or near the station A above the predetermined value at which the voltage regulating motor 19 operates, the field coil 12 thereof will be energized to decrease the voltage of the direct current end of the generating apparatus 5, thereby decreasing the voltage across the work circuit 3, 3, at that station. This will cause the station B to furnish energy to the work circuit at station A to help take the increase in load, so as to maintain the station current furnished by station A substantially constant (within the range of action of the voltage regulating means 13, 15, 19, etc.) at the predetermined value for which the voltage regulating motor 19 is set, whereby during increases in load current on the work circuit adjacent the station A above this predetermined value the station acts as a constant current station. It may happen that this increase at station B may be sufficient to cause the regulating apparatus at that station to operate in a similar manner to cause the voltage of the direct current end of its converter apparatus 5 to be decreased, whereby part of the extra load will be furnished or supplied by the sub-station C. It will thus be apparent that load on each of the various sub-stations (which stations are preferably of the constant potential type) is limited to a substantially predetermined value and this irrespective of whether the characteristic of the generating apparatus at the sub-station is flat, rising or drooping. With a rising characteristic my invention is especially advantageous since it allows of the work circuit being fed at the full voltage until the load thereon has reached its maximum, and then the load is prevented from further increasing on that station by the action of the regulating load limit devices which operate to decrease the voltage at that sub-station.

Referring to Fig. 3, the system there shown is substantially like the system shown in Fig. 1, in operation and construction, with the exception that storage batteries 33 are provided, connected across the work circuit 3, 3, at points intermediate the stations A, B, etc., which points are also distant from the stations A and B. When an excessive load occurs on any sub-station, for instance, at the station A and the load is so great that the regulating apparatus, including motor 19 and arm 15, is caused to be operated, the voltage across the work circuit 3, 3, at that station is materially dropped, whereupon the battery 33 will furnish energy to the work circuit at that point to help take the increased load. The overload at the station A, however, may be so great as to not only draw energy from the battery 33 nearest thereto but may also draw energy from the sub-station B and even to an amount sufficient to cause its load limiting apparatus to operate to decrease the voltage across the work circuit at that point, and thereby cause energy to be drawn from the second battery 33 at the right of sub-station B.

Referring to Fig. 4, the parts are substantially the same as in Figs. 1 and 3, with the exception that the series field coils 9 have been omitted from the rotary converters 5 and the shunt coils 10 are so arranged that the resistance 13 is included in series therewith and made variable by means of the movable arm 15. Thus when the load on any one of these sub-stations is desired to be limited and the load has reached that predetermined point the motor 19 operates to move the arm 15 over the contact points of the variable resistance 13, so that resistance is inserted in series with the shunt field coil 10 which is connected across the direct current circuit 8, 8. Another modification in Fig. 4 is the arrangement of batteries 34, 34 connected directly across the direct current circuits 8, 8 at the sub-stations A, B, etc. Also in this Fig. 4 the rotary converters 5 are shown with shunt field windings merely, so that the voltage of the converters drops with increase of load thereon, whereby a drooping characteristic thereof is provided. This, however, does not affect the operation of the load limiting devices including motor 19 and arm 15, but varies the action of batteries 34 and allows them to more directly aid in taking extra load when such extra load falls upon any one of the sub-stations.

Referring to Fig. 5, 35 represents a source of high tension alternating current feeding the high tension alternating current transmission circuit 36, 36. 37, 37 represent a single phase alternating current work circuit which is to be supplied from the transmission circuit 36, 36. For this purpose sub-stations D and E are provided at each of which is located a transformer 38, the primary of which is connected across the transmission or feeding circuit 36, 36 and the secondary of which is connected to the work circuit 37, 37. By means of conductors 39, 39, the work circuit 37, 37 may supply cars 40 operated by single phase motors, or any other suitable translating devices. 41 represents one coil of a transformer, which coil is connected in series with the conductors 39. 42 represents the second coil of each of these transformers, which coil is connected to be supplied by the transmission circuit 36, 36. The coil 42 is, therefore, supplied from a substantially constant voltage and if its position was fixed it would produce a substantially constant effect upon the secondary coil 41. The coil 42, however, is arranged to be rotated or oscillated by means of a shaft 43. As the shaft 43 is oscillated the coil 42 rotates in a direction to cause a counter-electromotive force to be set up within the coil 40 to oppose the electromotive force supplied to the conductors 39, 39 by transformer 38. This counter-electromotive force, therefore, cuts down the electromotive force applied to the work circuit 37, 37 at the sub-station. When the load on any of the sub-stations reaches a predetermined value and it is desired to limit the load to that value the coil 42 is brought into operation to cut down the electromotive force applied to the work circuit 37, 37 at that station, so that energy will be supplied from an adjacent station or source to take the increase in load. The rotation or movement of coil 42 and shaft 43 is accomplished by means of a worm 44 rotating a worm gear 45 upon the shaft 43. The worm 44 is fixed to the shaft 46 which is rotated by series motor 47. The motor 47 is connected to be supplied by the secondary of the transformer 48, the primary of which is in series with one of the conductors 39, so that the transformer 48 and motor 47 is made responsive to changes in the current output of the sub-station. 49 represents a weight supported by a cable 50 arranged to be wound upon a spool 51 when the motor 47 rotates. 52 represents a resistance included in a circuit 53, which circuit is arranged to shunt the secondary of transformer 48. The value of resistance 52 is controlled by means of an arm 54 arranged to be moved over the various contacts of said resistance by means of a gear 55 operated by a worm 56 secured to the shaft 16. 57 represents a stop against which the arm 54 is brought and which limits its movement in one direction. When the motor does not generate sufficient torque to raise the weight 49 the arm 54 is brought against stop 57, whereby the circuit 53 is opened and the full effect of transformer 48 is had upon the motor 47. In this position the coil 42 is arranged so that it has substantially no effect upon the coil 41. When one of the sub-stations becomes overloaded to a point where it is desired to limit further load on that station the transformer 48 supplies sufficient current to the motor 47 to cause it to generate a sufficient torque to raise the weight 49 and move the coil 42 in a position to introduce a counter-electromotive force in the conductor 39, and thereby reduce the voltage applied to the work circuit at that sub-station. This operation also causes a movement of the arm 54 over the various contacts of resistance 52, thereby gradually shunting the secondary of transformer 48 and decreasing its effect upon the motor 47. The arm 54 is arranged to short-circuit the secondary of transformer 48, when given its maximum movement, this, however, will not occur in practice, since an equilibrium will be reached before the arm has attained that position. It will be apparent that this shunting arrangement of the secondary of the transformer 48 may be equally well applied to the system shown in Fig. 4, in which case the resistance 23 would be gradually shunted and the shunting apparatus would be controlled by the motor 19.

It will thus be seen that my invention in its broadest aspects is equally applicable to alternating current work circuits as well as direct current work circuits and that the load on any sub-station may be limited to any predetermined value desired and that when this predetermined value is exceeded the excess load is furnished by one or more adjacent sub-stations.

If desired the system shown in Fig. 5 may be provided with compensatory storage batteries 58 intermediate the various sub-stations or located in any other suitable place along the work circuit. It will, of course, be understood that a suitable converting apparatus 59 will be inserted in order to transfer energy from any of the batteries 58 to the work circuit 37, 37.

From the above it will be apparent that I provide an exceptionally efficient and economical means for limiting the load on the various sub-stations of a long distance transmission line and that thereby many important advantages are derived. By limiting the load in the manner shown and described a rising characteristic may be given to the various sub-station units whereby, with increase in load, an increase in the station voltage may be had so that energy is not lost by furnishing a moderate increase in load at much lower voltages. The employment of rising characteristic stations, made feasible by my invention, serves to materially lessen the line losses. It is also apparent that my improvements are applicable with or without the addition of compensatory storage batteries, and that any of the various arrangements of sub-stations shown in any of the Figs. 1, 3 or 4, may be substituted for any of the others to form a single system of electrical distribution.

While I have illustrated systems having transmission lines and substations, yet it is to be understood that my invention in its broader aspects is applicable whether or not a plurality of substations, as distinguished from prime generating stations are employed.

I do not desire that my improvements be limited to their application to the specific systems shown since many other arrangements may be had without departing from the spirit and scope of my invention, and although I have described my invention with great detail I do not desire to be limited by such details, but Having fully and clearly shown and described my improvements what I claim as new and desire to secure by Letters Patent, is:

1. In an electrical system of distribution, a transmission line, a work circuit, a plurality of sub-stations located along said line, each having means for transferring energy from the transmission line to the work circuit, and means at each station for reducing the voltage thereof rendered active only at a predetermined increase of station current, said means maintaining substantially said predetermined current.

2. The combination with an electrical work circuit and several feeding stations therefor, and an apparatus at each station rendered active by a predetermined increase of current therefrom to insure further load increases on the work circuit being carried by more lightly loaded stations.

3. In an electrical work circuit, a plurality of stations of the constant potential type feeding the same, and means at each station acting while there is a predetermined increase of current therefrom for regulating that station as a constant current station.

4. An electrical work circuit, a plurality of stations feeding the same, a current actuated voltage regulator at each station, means for preventing the actuation of said regulator until a predetermined station current is reached, said voltage regulator acting to maintain said current substantially constant within the range of action of the regulator.

5. In an electrical work circuit, a plurality of stations feeding the same having dynamo apparatus including exciting windings therefor, an opposing winding for each apparatus and a regulator responsive to station output controlling the current in said opposing winding.

6. In an electrical work circuit, a plurality of feeding stations of the constant potential type, a plurality of compensatory batteries connected across the circuit, and apparatus at each station acting upon a predetermined output thereof for maintaining a substantially constant station output.

7. The combination of a long distance electrical transmission circuit, a work circuit, a plurality of sub-stations distributed along the transmission circuit, each station having means for transferring energy from one circuit to the other, and apparatus at each station acting in response to a predetermined output thereof for changing the characteristic of the station to maintain, within the limits of operation of the apparatus, an approximately constant current therefrom.

In testimony whereof, I have signed my name to this specification, in the presence of two subscribing witnesses.

ALBERT S. HUBBARD.

Witnesses:
  GORHAM CROSBY,
  EDWIN SEGER.